United States Patent
Bradley et al.

(10) Patent No.: US 10,326,841 B2
(45) Date of Patent: Jun. 18, 2019

(54) REMOTE DATA SECUREMENT ON MOBILE DEVICES

(71) Applicant: AirWatch, LLC, Atlanta, GA (US)

(72) Inventors: Chase Bradley, Atlanta, GA (US); Kevin Jones, Atlanta, GA (US)

(73) Assignee: VMware Inc., Palo Alto, CA (US)

( * ) Notice: Subject to any disclaimer, the term of this patent is extended or adjusted under 35 U.S.C. 154(b) by 153 days.

(21) Appl. No.: 15/175,230

(22) Filed: Jun. 7, 2016

(65) Prior Publication Data
US 2017/0353497 A1 Dec. 7, 2017

(51) Int. Cl.
*G06F 21/45* (2013.01)
*H04L 29/06* (2006.01)
*H04L 29/08* (2006.01)
*H04W 12/08* (2009.01)

(52) U.S. Cl.
CPC ............ *H04L 67/125* (2013.01); *G06F 21/45* (2013.01); *H04L 63/102* (2013.01); *H04L 63/20* (2013.01); *H04W 12/08* (2013.01)

(58) Field of Classification Search
CPC ..... H04L 63/20; H04L 67/125; H04L 63/102; G06F 21/57; G06F 21/60; G06F 21/75; G06F 21/77; G06F 21/45; H04W 12/08
See application file for complete search history.

(56) References Cited

U.S. PATENT DOCUMENTS

| | | | | |
|---|---|---|---|---|
| 8,012,219 | B2* | 9/2011 | Mendez | G06F 21/62 455/419 |
| 8,696,765 | B2* | 4/2014 | Mendez | G06F 21/62 455/419 |
| 9,692,748 | B2* | 6/2017 | Maheshwari | G06F 21/31 |
| 2007/0055752 | A1* | 3/2007 | Wiegand | H04L 63/0892 709/220 |

(Continued)

OTHER PUBLICATIONS

B. Steinke and K. Strohmenger, "Advanced Device self Management through Autonomics and Reconfigurability," 2007 16th IST Mobile and Wireless Communications Summit, Budapest, 2007, pp. 1-4. (Year: 2007).*

(Continued)

*Primary Examiner* — Robert B Leung
*Assistant Examiner* — Sameera Wickramasuriya
(74) *Attorney, Agent, or Firm* — Thomas | Horstemeyer, LLP (57) ABSTRACT

A server determines a status of a client device, wherein if the client device violates the compliance rule, the server accesses a device record established by the server for the client device. The device record comprises data specifying an operating system executing on the client device. The server determines whether the client device lacks an application native to the operating system of the client device with a programming interface that supports direct communication with the at least one computing device for remotely initiating execution of the native application. The server (Continued)

initiates execution of a computer-readable file on the client device in response to determining that the client device lacks the native application, where the computer-readable file comprises a routine for restricting access to a hard disk storage device of the client device without user interaction.

22 Claims, 5 Drawing Sheets

(56) References Cited

U.S. PATENT DOCUMENTS

| | | | | |
|---|---|---|---|---|
| 2011/0004941 | A1* | 1/2011 | Mendez | G06F 21/62 726/26 |
| 2013/0007245 | A1* | 1/2013 | Malik | H04L 41/0816 709/223 |
| 2013/0239192 | A1* | 9/2013 | Linga | G06F 21/44 726/7 |
| 2015/0052616 | A1* | 2/2015 | Hutchison | G06F 21/53 726/27 |
| 2016/0088021 | A1* | 3/2016 | Jayanti Venkata | H04L 63/0823 726/1 |
| 2016/0286394 | A1* | 9/2016 | Iyer | H04W 12/06 |

OTHER PUBLICATIONS

M. Ji, S. Kim, Y. Park and J. H. Yi, "Mobile device management system with portable devices," 2015 International Symposium on Consumer Electronics (ISCE), Madrid, 2015, pp. 1-2. (Year: 2015).*

T. Zefferer and P. Teufl, "Policy-based security assessment of mobile end-user devices an alternative to mobile device management solutions for Android smartphones," 2013 International Conference on Security and Cryptography (SECRYPT), Reykjavik, Iceland, 2013, pp. 1-8. (Year: 2013).*

* cited by examiner

REMOTE DATA SECUREMENT ON MOBILE DEVICES

BACKGROUND

Within the enterprise setting, it is essential for mobile device administrators to control access to such resources as electronic mail, contacts, calendar data, virtual private network (VPNs), and so on. Specifically, administrators must ensure that only authorized users have access to mobile devices as such devices may otherwise allow unauthorized users to gain access to the enterprise network environment. Enterprise administrators of smartphones, tablets, laptops, and other mobile devices therefore incorporate security measures to prevent unauthorized access to sensitive information and enterprise resources. In some cases, it may be necessary to perform a complete data wipe of a remote mobile device in the event that the mobile device is lost or stolen. Despite the availability of data wipe applications in various operating systems such as Windows® 7 and 8, many solutions require at least some degree of user interaction. Such solutions may also only delete a majority of file records while potentially leaving fragments of data behind. Furthermore, effectuating a complete data wipe remotely without user interaction is not supported natively in some operating systems.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Mobile device users in an enterprise environment may be granted access by administrators to electronic mail and other enterprise resources, thereby allowing users to work remotely. To reduce the cost of purchasing mobile devices and corresponding service charges, an enterprise further may allow employees to utilize personal mobile devices under a "bring your own device" (BYOD) policy to access enterprise resources. In a mobile device management setting involving a server/client device configuration, enterprise administrators implement various policies that impose certain restrictions on accessing enterprise resources by client devices. In some cases, however, a user may inadvertently misplace a mobile device or the mobile device may be stolen, thereby posing a potential security risk.

In Microsoft's® Office 365® suite, users are able to remotely wipe a mobile device using the Outlook Web App. However, the mobile device must be connected to Microsoft Exchange Online using Microsoft Exchange ActiveSync®. Furthermore, various solutions may also only delete a majority of file records while potentially leaving residual data behind. In this regard, effectuating a complete data wipe remotely without user interaction is not supported natively in some operating systems.

The present disclosure relates to remote securement of data on client devices to prevent unauthorized access to enterprise resources and sensitive data in an enterprise environment. A technical effect of the present disclosure is protection of sensitive data on an enterprise mobile device from unauthorized users by either remotely triggering a complete data wipe on the mobile device or remotely reimaging the mobile device without user interaction through the use of low level machine code.

One benefit of reimaging the hard disk of a mobile device rather than performing a complete data wipe of the hard disk is that the mobile device reboots into a default state with an operating system already installed. Furthermore, the enterprise administrator may elect to include one or more pre-installed applications such as an agent application on the reimaged mobile device. This allows the administrator to configure the reimaged mobile device to execute the agent application and automatically re-enroll the mobile device with an enterprise server, thereby avoiding the need for the user to physically bring the mobile device to the enterprise administrator to manually reconfigure the mobile device. In some cases (e.g., theft of the device), however, the administrator may elect to perform a complete data wipe of the mobile device.

In the context of a server/client device configuration, remote triggering of a data wipe or reimaging of the client device may be initiated by way of placing a command from an enterprise server in a command queue, which the client device then accesses to fetch commands intended for the client device. The client device automatically executes the action(s) associated with the command without the need for user interaction upon fetching the command from the command queue. Furthermore, the user of the client device is locked out during execution of the fetched command, thereby preempting the user from halting or tampering with the data securement process. Specifically, in the event that non-compliant activity by a client device reaches a threshold level of severity, an administrator may initiate a security measure to completely wipe all the data on the client device or cause the client device to revert back to a default state.

Figure 1:
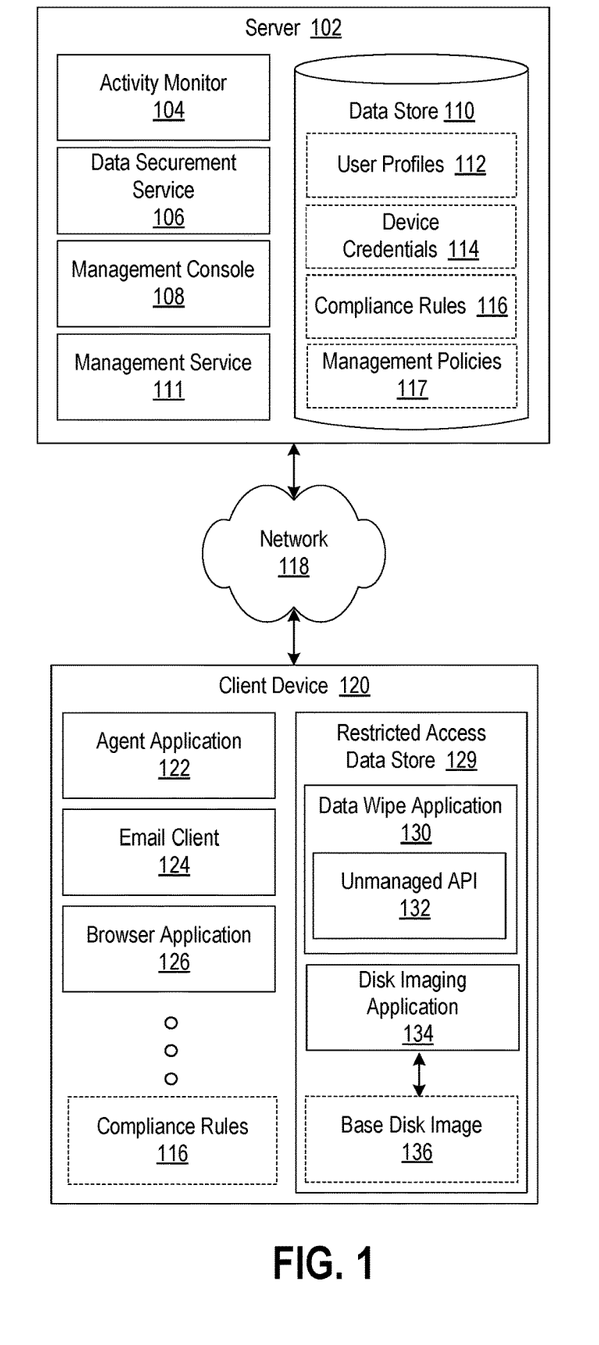
FIG. 1 is a block diagram of a networked environment for securing data on a remote client device in accordance with various embodiments.

A description of a system for implementing remote data securement is now described followed by a discussion of the operation of the components within the system. FIG. 1 is a networked environment 100 that includes a server 102 and a client device 120 communicatively coupled over a network 118. The network 118 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The server 102 may comprise, for example, a server computer or any other system providing computing capability. Alternatively, the server 102 may employ a plurality of computing devices that may be arranged, for example, in one or more server banks, computer banks or other arrangements. Such computing devices may be located in a single installation or may be distributed among different geographical locations. For example, the server 102 may include a plurality of computing devices that may collectively comprise a hosted computing resource, a grid computing resource and/or any other distributed computing arrangement. In some cases, the server 102 may correspond to an elastic computing resource where the allotted capacity of processing, network, storage, or other computing-related resources may vary over time. The server 102 may also include or correspond to one or more virtualized server instances that are created in order to execute the functionality that is described herein.

The server 102 includes a data store 110 accessible to the server 102, where the data store 110 may be representative of a plurality of data stores. The data stored in the data store 110, for example, is associated with the operation of the various applications and/or functional entities described below that are executed in the server 102. Various components execute on a processor of the server 102 and configure the processor to perform various operations, as described in more detail below.

The activity monitor 104 is executed to monitor the activities of one or more client devices 120 with respect to enterprise resources. The management console 108 is executed to facilitate administration and management of client devices 120 associated with users that are accessing enterprise resources. The management console 108 logs data captured by the activity monitor 104 and executes in conjunction with the activity monitor 104 to determine whether activities associated with client devices 120 comply with enterprise resource policies established by the administrator based on data describing the state of the client device 120 and based on compliance rules 116, as described below.

Data describing the state of the client device 120 can specify, for instance, various settings that are applied to the client device 120, applications that are installed on or that are being executed by the client device 120, and files that are installed on or are accessible to the client device 120. Such settings may comprise values (e.g., IP address of a server 102) that enable functionality (e.g., turn on disk encryption) or disable functionality (e.g., require TLS/disable HTTP traffic). In this regard, such settings may comprise configurations or restrictions.

Additionally, the data describing the state of the client device 120 can specify information related to the management of the client device 120 such as the last time the client device 120 provided its state information to the activity monitor 104, whether the client device 120 is in a state of compliance with any applicable compliance rules 116, and whether any remedial actions have been or are to be taken as a result of a noncompliance with any applicable compliance rules 116. With regards to the management of the client device 120, a device record established by the server 102 may specify organizational groups (e.g., sales and marketing, legal) that the client device 120 is a member of. In some implementations, the enterprise administrator may incorporate a static hard coded relationship between the client device 120 and an organizational group. Alternatively, the enterprise administrator may implement a dynamic evaluation of a membership condition associated with an organizational group.

Data describing compliance rules 116 with which the client device 120 must comply can specify, for instance, one or more remedial actions that should be performed in the event that an associated rule condition occurs, as described later herein. Further, data describing management policies 117 can include permissions or access rights of the client device 120 and settings that are being enforced upon the client device 120 for purposes of controlling if, when, and how the client device 120 is permitted to function. In some embodiments, the data describing compliance rules 116 and the data describing management policies 117 are obtained from an organizational record associated with an organizational group to which the client device 120 is a member. For each client device 120, a device record is established and maintained by the server 102, where the compliance rules 116 and management policies 117 associated with the organizational group are reflected in the device record for each member client device 120.

To associate the client device 120 with an organizational group, the server 102 stores data in a device record for the client device 120 indicating that the client device 120 is in a particular organizational group. In some instances, associating the client device 120 with the organizational group involves generating or modifying a data structure that represents associations between particular client devices 120 and a particular organizational group. For instance, the server 102 can generate a data structure representing an organizational group. The data structure can include sub-components having data representing particular client devices 120 and data representing particular compliance rules 116.

By virtue of including a sub-component representing a particular client device 120 within a data structure that represents a particular organizational group, the server 102 can indicate that the client device 120 is associated with the organizational group. Also, by virtue of including a sub-component representing a particular compliance rule 116, the server 102 can indicate that the compliance rule 116 is associated with the organizational group. Further, by virtue of including both a sub-component representing a particular client device 120 and a particular compliance rule 116, the server 102 can indicate that the client device 120 must comply with the compliance rule 116 due to their respective associations with the organizational group.

The activity monitor 104 in the server 102 is further configured to maintain a command queue of commands that are designated for execution by the client device 120, where each client device 120 has a corresponding command queue. A client device 120 can be provisioned by the server 102 by causing resources to be installed or stored on the client device 120 through the use of the command queue. To implement such a process, the server 102 places a command related to provisioning in the command queue. Additionally, the server 102 can store a command related to a remedial action associated with a compliance rule 116 in the command queue in the event that the activity monitor 104 determines that a rule condition associated with the compliance rule 116 has occurred. For example, where the data wipe application is already stored locally on the client device 120, the server 102 may be configured to store a data wipe command in the command queue.

Upon retrieval of the command by the client device 120, the command automatically initiates execution of the data wipe application on the client device 120. For implementations where the data wipe application is not resident on the client device, the server 102 can store the data wipe application in the command queue for the client device 120 to retrieve and subsequently execute. Alternatively, the server 102 can store data in the command queue that instructs the client device 120 to retrieve the data wipe application from a third party. Whether a provisioning command or a command related to a remedial action is stored in the command queue, the client device 120 can retrieve commands stored in its assigned command queue through various ways including, for example, a client-server "pull" configuration or a client-server "push" configuration.

The management console 108 is executed to generate a user interface that is utilized by an administrator to enroll, activate, remove, deactivate, or otherwise manage client devices 120 that have been granted access to enterprise resources. The user interface provides the administrator with a real-time view of the compliance status of each enrolled client device 120 and facilitates the decision-making process of the administrator in the event that a client device 120 violates a compliance rule 116.

The data securement service 106 is executed to receive device commands and messages issued from the management console 108 by the administrator. The data securement service 106 then stores the one or more commands in a command queue, which the client device 120 then accesses over the network 118. In some embodiments, the commands may include device status queries, device wipe, device reimaging, device lock, and other operations.

The data in the data store 110 includes, for example, user profile data 112, device credential data 114, compliance rules 116, management policies 117, among other data. The user profile data 112 includes data associated with a user account, such as mailbox data, calendar data, contact data, and so on. Device credential data 114 may include resource access settings for each specific client device 120. The device credential data 114 may include, for example, authentication credentials, delegation settings (e.g., information about other users who may be provided access to the user profile data 112 of a particular user), mail and document retention rules and/or policies, and/or other geographic access restrictions or limitations (e.g., information about certain locations and/or networks from which enterprise resources can be accessed). User profile data 112 may also include other account settings, such as biographical or demographic information about a user, password reset information, multi-factor authentication settings, and other data related to a user account.

Compliance rules 116 in the data store 110 of the server 102 represent enterprise resource usage policies established by the administrator where the usage activities associated with the client device 120 must comply with such compliance rules 116 in order to gain access to enterprise resources. If one or more activities of a client device are determined to be non-compliant, escalating remedial actions are performed by the administrator to bring the client device 120 back into compliance. As the nature of the non-compliant activity increases in severity, the corresponding remedial action escalates accordingly. Such escalating remedial actions may be embodied as commands that are stored in a command queue by the administrator using the management console 108 and fetched by the client device 120. In some embodiments, the commands fetched by the client device 120 serve to trigger execution of one or more applications pre-loaded onto the client device 120.

As discussed above, the activities of the client device 120 are tracked by the activity monitor 104. Depending on the severity of a non-compliant activity associated with the client device 120, an administrator may elect to perform a complete data wipe of the client device 120 and un-enroll the client device 120 such that the client device 120 ceases to have access to enterprise resources. As an alternative, the administrator may elect to reimage the client device 120 such that the operating system of the client device 120 reverts back to a default state. As described in more detail below, compliance rules 116 may also be stored on the client device 120, where an agent application 122 reports any violations of compliance rules 116 to the server 102. In this regard, compliance rules 116, 128 can be stored in the data store 110 and/or on the client device 120 and represent requirements with which a user and/or a client device 120 must comply in order to access enterprise resources.

The activity monitor 104 may associate a particular management policy 117 with an organizational group. A management policy 117 can specify how if, when, and how a client device 120 is authorized to function. A management policy 117 can specify that the client device 120 has such permission by virtue of the client device 120 being associated with an organization group that is associated with the management policy 117. That is, the management policy 117 may be created by an enterprise administrator specifying the permissions without any reference to a particular client device 120. Instead, the management policy 117 can be created and associated with an organizational group, which may, over time, include different client devices 120. In this way, a client device 120 becomes subject to the management policy 117 by virtue of becoming a member of the organizational group.

In one instance, a client device 120 can become a member of or become associated with an organizational group when an administrator of the organizational group specifies that the client device 120 should be a member through a static hard coding. In another instance, a client device 120 can become a member of an organizational group when a membership condition is satisfied through a dynamic evaluation of the membership condition. A membership condition can be created by an administrator of the organizational group by specifying a condition related to the client device 120 that when satisfied, causes the membership of the organizational group to include the client device 120. Conversely, the membership condition can also specify a condition related to the client device 120 that, when not satisfied, causes the membership of the organizational group to exclude the client device 120.

It should also be understood that a client device 120 can become (or cease to be) a member of an organizational group based on the users of the client device 120. In particular, through a static hard coding or an evaluation of a membership condition, a particular individual can be identified for membership within an organizational group. Once that particular individual has been identified as a member of the organizational group, one or more client devices 120 that the particular individual has or is using can become members of the organizational group. In this way, by virtue of a particular individual being a member of an organizational group, all the client devices 120 operated by the particular individual become subject to the management policies 117 and compliance rules 116 associated with the organizational group—thereby controlling if, when, and how such client devices 120 may be operated by the particular individual.

As an example of the above, a particular management policy 117 associated with a particular organizational group can specify that any client device 120 that is associated with the organizational group is prohibited from accessing confidential resources associated with the organizational group. The particular management policy 117 can be associated with a membership condition that specifies that any client device 120 that is determined to be physically located within a public area should be a member of the particular organizational group. As a result, a management service 111 executing in the server 102 can dynamically change the membership of the particular organizational group such that the membership includes client devices 120 that are physically located within the public area. Further, the management service 111 can determine that, due to being a member of the particular organizational group, the client devices 120 located in the public area are prohibited from accessing the confidential resources associated with the particular organizational group. Thereafter, if the management service 111 determines that a client device 120 is no longer located in the public area, the activity monitor 104 in the server 102 can remove the client device 120 from the membership of the organizational group, which further causes the client device 120 to no longer be prohibited from accessing the confidential resources associated with the organizational group (assuming that the client device 120 is otherwise authorized to access the confidential resources).

The management service 111 can associate a management policy 117 with a compliance rule 116. A compliance rule 116 can specify a rule condition and an action that should be taken by the management service 111 if it is determined that the rule condition has occurred (i.e., a remedial action). In some embodiments, a rule condition of a compliance rule 116 can reflect the specifications of a management policy 117. For example, a compliance rule 116 can include a rule condition for an attempt by a member of a particular organizational group to access confidential resources associated with the organizational group.

As another example, a compliance rule 116 may specify that a client device 120 must periodically connect to the server 102 provide the activity monitor 104 with status updates according to a predetermined time interval in order to access enterprise resources. Another example of a compliance rule 116 may comprise a requirement that an operating system of the client device 120 be left unmodified with respect to root access or superuser privileges available to the user as certain users may otherwise attempt to remove applications (e.g., agent application 122) from the client device in order to prevent monitoring by the server 102. Another compliance rule 116 may prohibit attempts to gain unauthorized access to restricted access storage on the client device 120. For example, the hard drive of the client device 120 may be encrypted using Microsoft® BitLocker®. Any unauthorized attempts to circumvent the BitLocker® encryption would constitute a non-compliant activity on the client device 120.

One or more remedial actions may be applied where the remedial actions are ordered by assumed likelihood. For example, where the operating system of the client device 120 has been modified, the remedial actions may comprise notifying the user of the client device 120 of non-compliance and/or any duration until further remedial action will be taken, performing an enterprise wipe (wiping enterprise related content from the client device 120 without affecting personal content on the client device 120), locking or blocking local or remote services by uninstalling profiles on the client device 120 that allow the client device 120 to use the services, by instructing a gateway service to block traffic, or by instructing remote services to stop serving the device. Other remedial actions may include a full client device 120 wipe as described herein, and un-enrolling the client device 120 by removing a mobile device management (MDM) profile and/or agent from the client device 120, and/or by removing device record from the server 102.

Another compliance rule 116 may prohibit certain unauthorized application (e.g., malware) from being installed onto the client device 120. Remedial actions corresponding to this compliance rule 116 may include notifying the user of the client device 120 of non-compliance and/or notifying the user that an authorized version of the application is available, and/or notifying the user of a duration until further remedial action will be taken. Other remedial actions corresponding to this compliance rule 116 may include removing the application from the client device 120, installing an authorized version of the application onto the client device 120, and performing an enterprise wipe.

Another compliance rule 116 may prohibit removal of enterprise applications (e.g., agent application 122) from the client device 120. Remedial actions corresponding to this compliance rule 116 may include notifying the user of the client device 120 of non-compliance and/or providing the user with information on how to re-enroll the client device 120. Other remedial actions corresponding to this compliance rule 116 may include forcing re-installation of the application (e.g., agent application 122), and performing an enterprise wipe.

Another compliance rule 116 may relate to invalid credential being provided by the user or credentials failing to meet security requirements. Remedial actions corresponding to this compliance rule 116 may include locking the client device 120, blocking access to local or remote services, performing an enterprise wipe, performing a full client device 120 wipe, and un-enrolling the client device 120.

Compliance rules 116 are thus configured to recognize attempts to thwart a related management policy 117. Continuing with the example, the compliance rule 116 can specify that access to a client device 120 from which the access attempt was made should be locked (i.e., the remedial action). In the event that the server 102 determines that the rule condition of the compliance rule 116 has been triggered, the server 102 can cause the remedial action of the compliance rule 116 to be performed or enforced.

The client device 120 in FIG. 1 may be embodied as a processor-based system such as a desktop computer, a laptop computer, a smartphone, a tablet computer system, and so on. The client device 120 includes a display that comprises, for example, one or more devices such as liquid crystal display (LCD) displays or other types of display devices. The client device 120 is equipped with networking capability or networking interfaces, including a localized networking or communication capability, thereby allowing the client device 120 to be communicatively coupled to the server 102 over a network 118.

The client device 120 executes various applications, such as an agent application 122, an email client 124, a browser 126, and other applications, services, or processes. The agent application 122 is in communication with various components on the server 102, including the activity monitor 104, thereby providing visibility with respect to the operation status of the client device 120. Where compliance rules 116 are stored locally on the client device 120, the agent application 122 includes a compliance engine for monitoring the activities associated with the client device 120. For such embodiments, the agent application 122 notifies the activity monitor 104 in the server 102 in the event that a non-compliant activity associated with the client device 120 is detected.

The email client 124 is executed to gain access to such data as mailbox data, calendar data, contact data, and so on. Where compliance rules 116 are stored locally on the client device 120, the agent application 122 monitors activities associated with the email client 124, the browser, and other applications installed on the client device 120 to determine whether activities associated with the client device 120 comply with the compliance rules 116.

The client device 120 may include a restricted access data store 129 configured to only allow authorized users (e.g., an enterprise administrator) access to data stored within the restricted access data store 129. In some embodiments, the restricted access data store 129 may comprise an encrypted portion of a physical storage device on the client device 120. In some embodiments, the restricted access data store 129 may include a pre-loaded data wipe application 130 executed to perform a complete data wipe of the client device 120. In some embodiments, the pre-loaded data wipe application 130 automatically executes without user interaction upon a command being fetched by the client device 120 from a command queue maintained by the server 102.

The data wipe application 130 may be embodied as an unmanaged application program interface (API) compiled to machine-level code and executed directly by the operating system of the client device 120. The restricted access data store 129 may also store a disk imaging application 134 executed to reimage the hard disk drive of the client device 120 using a base disk image 136 established by the enterprise administrator. The base disk image 136 contains the contents/structure of a default disk volume and causes the client device 120 to revert back to a default state. The disk imaging application 134 may be similarly configured to automatically execute without user interaction upon a command being fetched by the client device 120 from a command queue maintained by the server 102.

Figure 2:
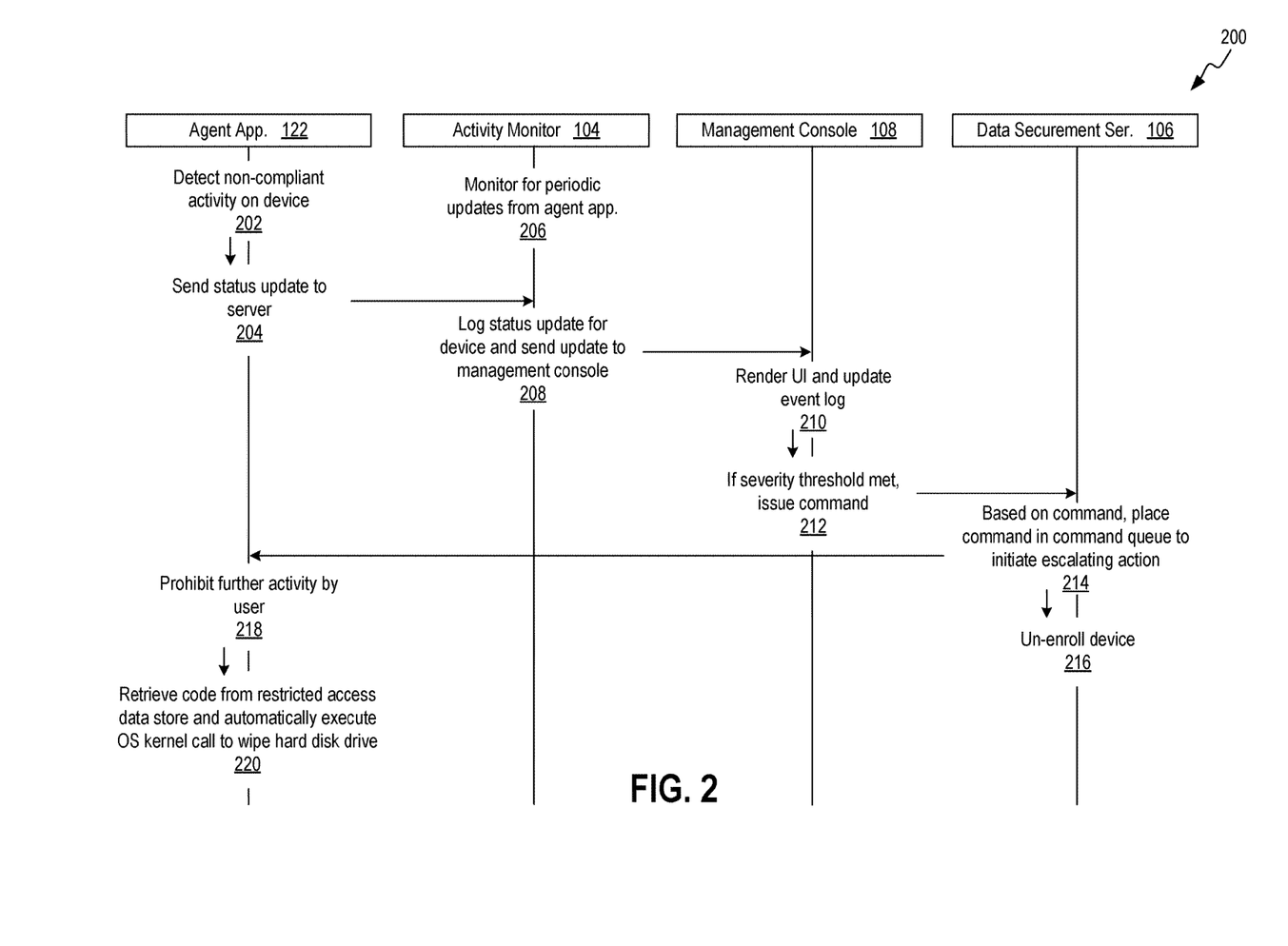
FIG. 2 is a sequence diagram that illustrates the interaction between various components in the networked environment of FIG. 1 in accordance with various embodiments.

Having described various components of the server 102 and the client device 120, reference is now made to FIG. 2, which is a sequence diagram 200 that illustrates the interaction between various components in the networked environment of FIG. 1. At step 202, the agent application 122 executing in the client device 120 detects non-compliant activity associated with the client device 120, and at step 204, the agent application 122 sends a status update to the activity monitor 104 executing on the server 102. At step 206, the activity monitor 104 monitors periodic status updates sent by the agent application 122. At step 208, the activity monitor 104 logs the status update and sends an update to the management console 108.

At step 210, the management console 108 renders a user interface and updates the event log. The user interface provides visibility into both enterprise-owned and employee-owned client devices 120, thereby facilitating the management of all such devices by the enterprise administrator. At step 212, if detected non-compliant activity meets a severity threshold, then the administrator may elect to issue a command corresponding to, for example, a complete data wipe of the non-compliant client device 120.

The severity of the activity associated with the client device 120 is tied to the particular compliance rule that is violated. As an example, repeated attempts to gain unauthorized access to restricted access storage on the client device 120 or repeated attempts to uninstall the agent application 122 could constitute non-compliant activities that meet the severity threshold. If the severity threshold is met, the administrator issues a corresponding command using the management console. Note that as an alternative, the management console 108 could be pre-configured by the enterprise administrator such that issuance of the command is automatically performed by the management console.

In response to determining that the client device 120 violates a compliance rule, a device record established by the server 102 for the client device 120 is accessed, where the device record may comprise data specifying an operating system executing on the client device. The server 102 determines whether the client device 120 lacks an application native to the operating system of the client device 120 with a programming interface that supports direct communication with the server 102 for remotely initiating execution of the native application.

At step 214, the data securement service 106 retrieves a corresponding command specific to the client device 120 and stores the command in a command queue corresponding to the client device 120. In some embodiments, the retrieved command is specific to the type of device (e.g., laptop) and the particular operating system (e.g., Windows® 7, Windows® 8) installed on the client device 120. Where the command stored in the command queue corresponds to a complete data wipe of the client device 120, the data securement service 106 un-enrolls the client device 120 (step 216), thereby preventing further access to enterprise resources.

At step 218, the agent application 122 fetches the command from the command queue and prohibits further activities by the user with respect to the client device 120. For example, the agent application 122 may be configured to display a notification to the user to alert the user that the user is barred from further use of the client device 120. In other embodiments, however, a notification is not provided to the user and the action corresponding to the fetched command is automatically executed without alerting the user.

At step 220, the agent application 122 retrieves instruction code from the restricted access data store 129, and the retrieved instruction code automatically executes. In some embodiments, the instruction code initiates one or more operating system (OS) kernel calls to perform a complete data wipe where a complete data wipe may be accomplished, for example, by reformatting the hard disk drive of the client device 120. Once the hard disk drive is reformatted, the client device 120 restarts. Thus, a technical effect of the sequence described above is the securement of data triggered by non-compliant activity associated with the client device 120 where user interaction is not needed.

Figure 3:
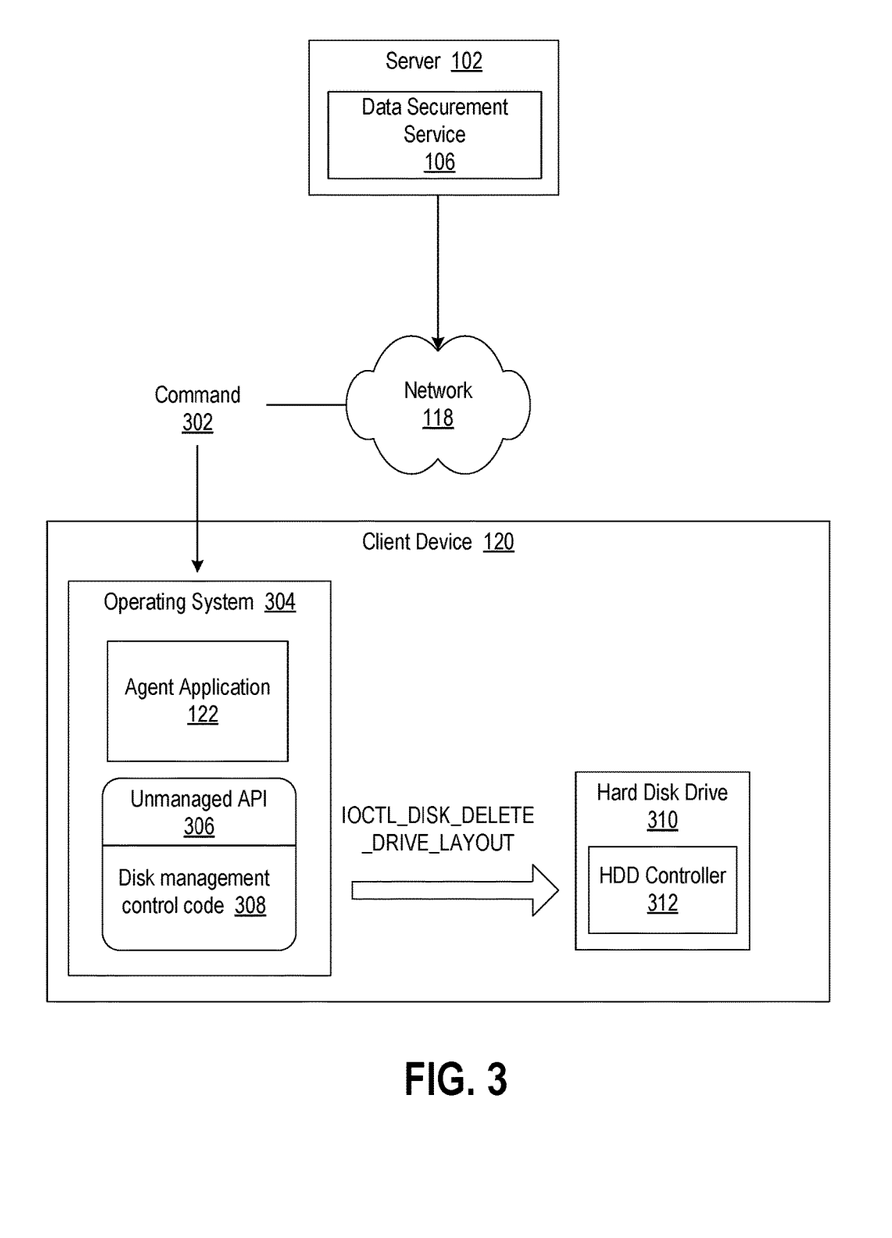
FIG. 3 is a block diagram illustrating the use of unmanaged code to achieve a complete data wipe of the client device of FIG. 1 in accordance with various embodiments.

FIG. 3 is a block diagram providing additional details regarding the use of unmanaged code to achieve a complete data wipe of the client device 120. As described above, the data securement service 106 executing in the server 102 places a command 302 in the command queue that the client device 120 accesses over a network 118. The operating system 304 running on the client device 120 manages both hardware and software resources of the client device, including the hard disk drive.

The agent application 122 executing on the client device 120 fetches the command 302 and retrieves a data wipe application 130 from the restricted access data store 129 to interface with the hard disk driver (HDD) controller 312 associated with the hard disk drive 310. In some implementations, the data wipe application 130 is developed using the Active Server Pages (ASP).Net 4.0/4.5 web application framework, where the data wipe application 130 may be implemented in such languages as C#, Visual Basic (VB).NET, F#, or other suitable language. As discussed above, for implementations where the data wipe application 130 is not resident on the client device 120, the server 102 stores the data wipe application 130 in the command queue maintained by the server 102. The client device 120 then fetches the data wipe application 130 from the command queue. Note that the command queue may be stored within the data store 110 of the server 102 or stored in another remote storage facility.

In some implementations, Interop APIs are utilized to call the Windows® Kernel32.dll to invoke a command under the DeviceIOControl function defined by Microsoft®. This particular function is utilized by the unmanaged API 306 to issue a control code directly to the hard disk drive driver. Specifically, as shown in FIG. 3, a disk management control code 308 defined by Microsoft® (e.g., the IOCTL_DISK_DELETE_DRIVE_LAYOUT control code) is invoked to remove the boot signature from the master boot record. Notably, all sectors on the disk are formatted without user interaction, thereby achieving a complete data wipe of the hard disk drive 310. Additionally re-imaging the data on the client device 120 can be accomplished by using a combination of partition and disk controls (e.g., IOCTL_DISK_GET_LAYOUT_EX and IOCTL_DISK_SET_LAYOUT_EX) to obtain and set the data directly with the kernel. These functions can be used to overwrite the existing data on the machine without user interaction.

Figure 4:
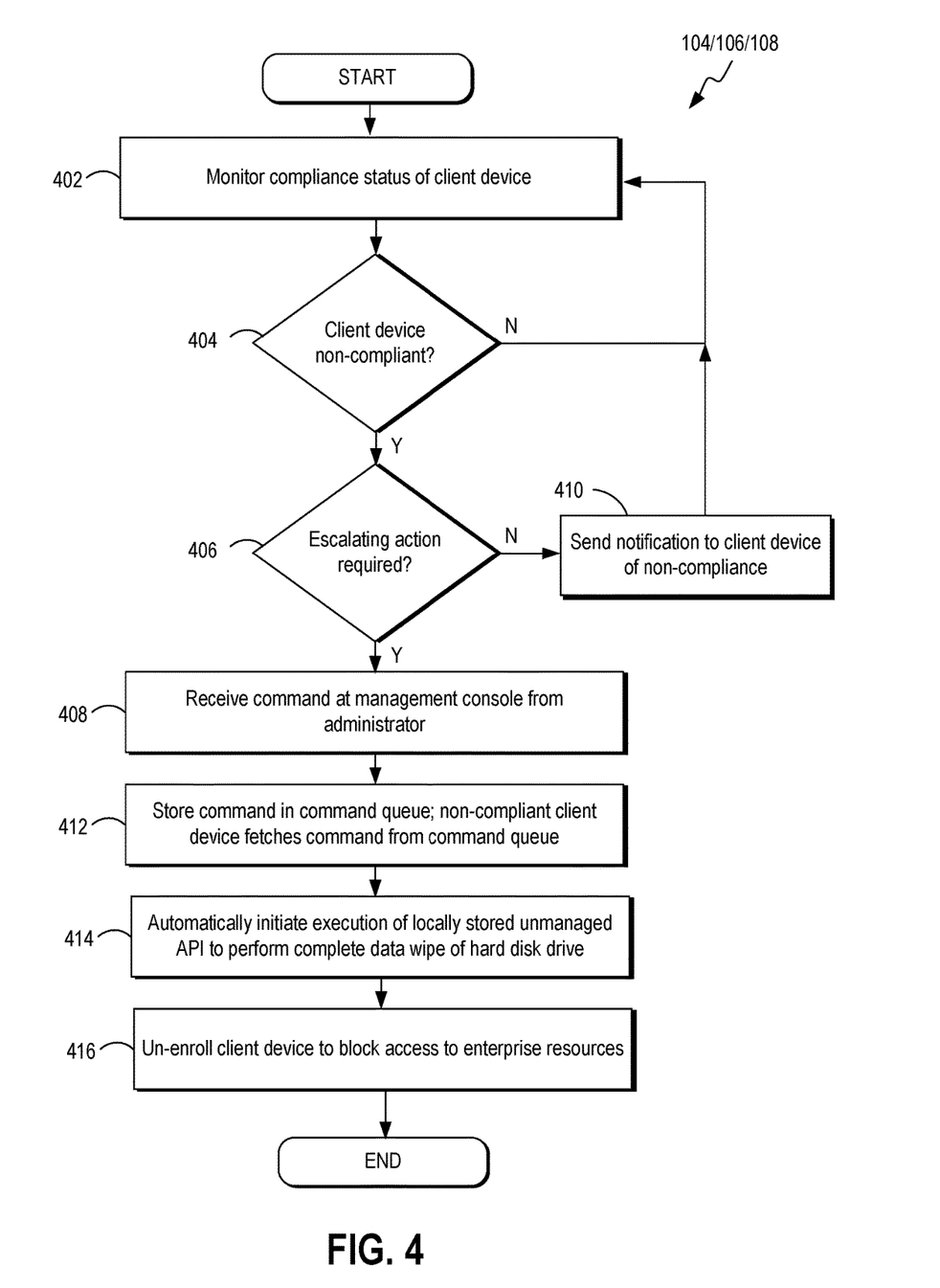
FIG. 4 is a flowchart that illustrates functionality of the activity monitor, the management console, and the data securement service in FIG. 1 for initiating a complete data wipe of the client device in accordance with various embodiments.

With reference back to the sequence diagram in FIG. 2, additional details regarding the functionality attributed to the individual components are now provided. Reference is made to FIG. 4, which is a flowchart that illustrates operation of the activity monitor 104, the management console 108, and the data securement service 106 executing on the server 102 for providing remote data securement by initiating a complete data wipe of the client device 120.

Beginning with step 402, the activity monitor 104 executing in the server 102 tracks the compliance status of the client device 120. The compliance status of the client device 120 may be determined by the server 102 and/or the client device 120. As discussed above, compliance rules 116, 128 may be stored on both the server 102 and on the client device 120. Thus, the activity monitor 104 may execute independently or in conjunction with the agent application 122 in the client device 120 to determine the compliance status of the client device 120.

In decision block 404, the activity monitor 104 determines whether the client device 120 has entered a non-compliant state. If the client device 120 has not entered a non-compliant state, the process proceeds back to step 402, where the activity monitor 104 continues to track the compliance status of the client device 120, otherwise the process proceeds to decision block 406.

In decision block 406, the activity monitor 104 determines whether an escalating action is required. As discussed above, if one or more activities of a client device are determined to be non-compliant, escalating actions are performed to bring the client device 120 back into compliance. As the nature of the non-compliant activity increases in severity, the corresponding action escalates accordingly. If the activity monitor 104 is notified by the client device 120 that the client device 120 is non-compliant, the activity monitor 104 alerts the enterprise administrator that an escalating action may be required and provides the enterprise administrator with a means for specifying a remedial action (e.g., a user interface control). As a result, in step 408, the management console 108 receives a command from the enterprise administrator. Note that as an alternative, the command may be generated automatically by the management console 108 for implementations where the enterprise administrator has pre-configured the management console 108 to operate accordingly.

Referring back to decision block 406, if an escalating action is not required, the activity monitor 104 notifies the client device 120 to alert the user of the non-compliance activity (step 410), and the process returns to step 402. As an example where an escalating action is not required, the activity monitor 104 may send a notification to the client device indicating that a recommended update is available for an application (e.g., the browser 126) installed on the client device 120.

Referring back to step 408, the process proceeds to step 412, where the data securement service 106 places the command specified by the administrator in a command queue. The agent application 122 executing on the client device 120 then fetches the command from the command queue. At step 414, the command issued by the data securement service 106 and fetched by the client device 120 from the command queue triggers execution of a locally stored unmanaged API 306, whereby the unmanaged API 306 performs a complete data wipe of the hard disk drive on the client device 120. At step 416, the data securement service 106 un-enrolls the client device 120 to prevent further access to enterprise resources. Thereafter, the process shown in FIG. 4 ends.

Figure 5:
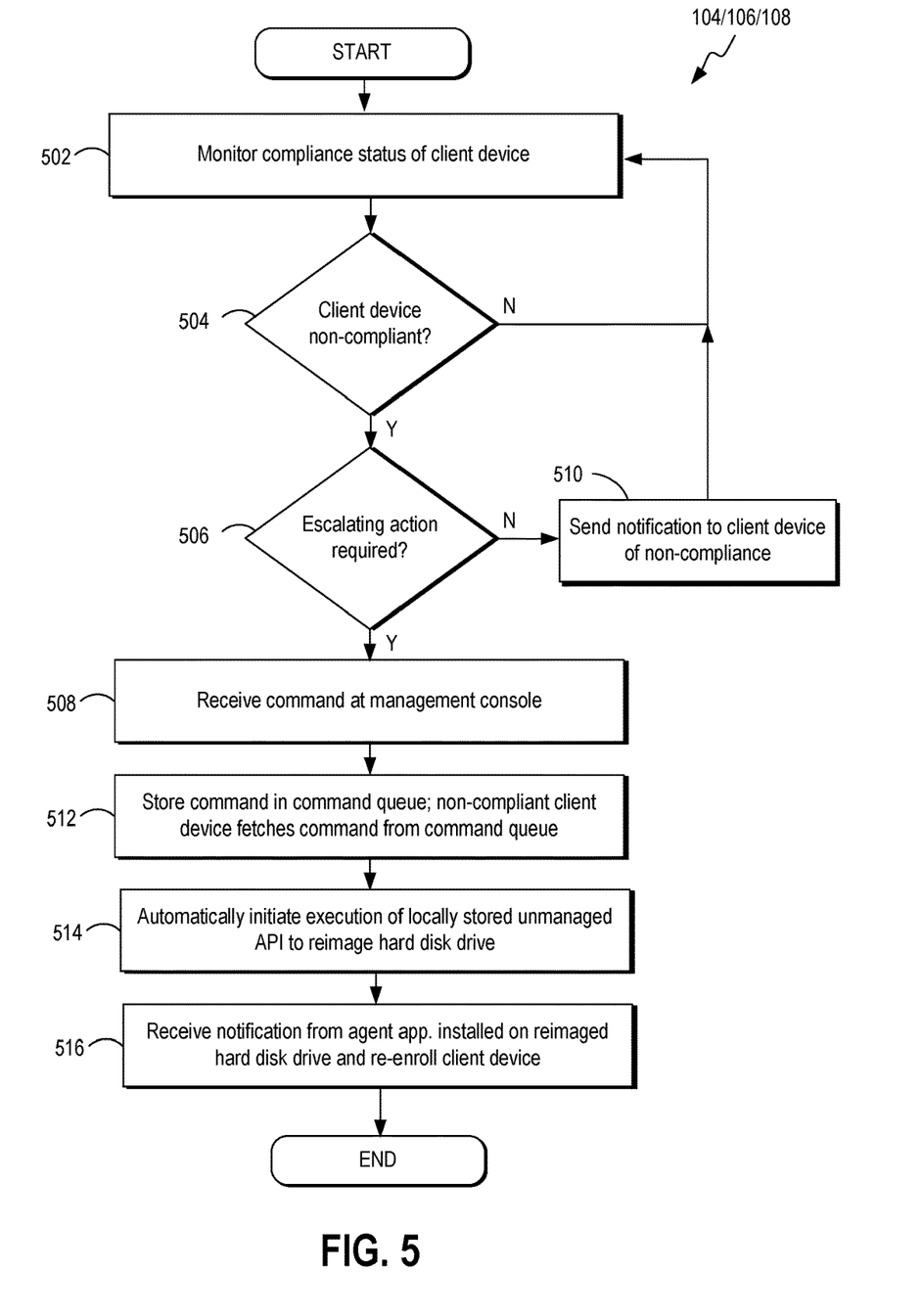
FIG. 5 is a flowchart that illustrates functionality of the activity monitor, the management console, and the data securement service in FIG. 1 for reimaging the hard disk drive of the client device in accordance with various embodiments.

Reference is made to FIG. 5, which is a flowchart that illustrates operation of the activity monitor 104, the management console 108, and the data securement service 106 executing on the server 102 for providing remote data securement by reimaging the hard disk drive of the client device 120.

Beginning with step 502, the activity monitor 104 executing in the server 102 tracks the compliance status of the client device 120. The compliance status of the client device 120 may be determined by the server 102 and/or the client device 120. As discussed above, compliance rules 116, 128 may be stored on both the server 102 and on the client device 120. Thus, the activity monitor 104 may execute independently or in conjunction with the agent application 122 in the client device 120 to determine the compliance status of the client device 120.

In decision block 504, the activity monitor 104 determines whether the client device 120 has entered a non-compliant state. If the client device 120 has not entered a non-compliant state, the process proceeds back to step 502, where the activity monitor 104 continues to track the compliance status of the client device 120, otherwise the process proceeds to decision block 506.

In decision block 506, the activity monitor 104 determines whether an escalating remedial action is required. As discussed above, if one or more activities of a client device are determined to be non-compliant, escalating actions are performed to bring the client device 120 back into compliance. As the nature of the non-compliant activity increases in severity, the corresponding action escalates accordingly. In response to determining that the client device 120 violates a compliance rule, a device record established by the server 102 for the client device 120 is accessed, where the device record may comprise data specifying an operating system executing on the client device.

The server 102 determines whether the client device 120 lacks an application native to the operating system of the client device 120 with a programming interface that supports direct communication with the server 102 for remotely initiating execution of the native application. If the activity monitor 104 determines that an escalating remedial action is required and that the client device 120 lacks an application native to the operating system that supports direct communication with the server 102 for remotely initiating execution of the native application (e.g., data wipe application), then in step 508, the management console 108 receives a command from the enterprise administrator. Note that as an alternative, the command may be generated automatically by the management console 108 for implementations where the enterprise administrator has pre-configured the management console 108 to operate accordingly.

Referring back to decision block 506, if an escalating action is not required, the activity monitor 104 sends a notification to the client device 120 to alert the user of the non-compliance activity (step 410), and the process returns to step 502. As an example where an escalating action is not required, the activity monitor 104 may send a notification to the client device indicating that a recommended update is available for an application (e.g., the browser 126) installed on the client device 120.

Referring back to step 508, the process proceeds to step 512, where the data securement service 106 stores the command specified by the administrator to the command queue that the agent application 122 executing on the client device 120 then accesses. At step 514, the command issued by the data securement service 106 and fetched by the client device 120 triggers execution of the locally stored unmanaged API 306, whereby the unmanaged API 306 reimages the hard disk drive on the client device 120. For some implementations, a base image of the hard disk drive applying during the reimaging process is stored locally on the client device 120. In other implementations, the agent application 122 may be configured to retrieve a base disk image designated by the enterprise administrator from the server 102 or other remote entity over the network 118. However, given the potentially large size of disk images, the base disk image will be typically stored locally on the client device 120.

Once the hard disk drive of the client device 120 has been reimaged, the client device 120 will reboot into a default state. For some implementations, an agent application 122 is included in the base disk image and will be installed on the client device 120 upon boot up. The agent application 122 executing on the reimaged client device 120 may be configured to automatically initiate the re-enrollment process with the server 102. At step 516, the activity monitor 104 at the server 102 receives a notification that the client device 120 has been reimaged and initiates the process of re-enrolling the client device 120. Thereafter, the process shown in FIG. 5 ends.

With regards to the flowcharts in FIGS. 4 and 5, it should be emphasized that the functionality attributed to the various components can be implemented in a single process or application executed by the server 102 or in multiple processes or applications. Furthermore, it should be emphasized that the separation or segmentation of functionality as discussed herein is presented for illustrative purposes only as various functions may be combined or performed concurrently.

The flowcharts of FIGS. 4 and 5 and the sequence diagram of FIG. 3 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the components described herein can be stored in one or more storage devices and be executable by one or more processors. Also, a data store, such as the data store 110 and the restricted access data store 129 can be stored in the one or more storage devices.

The various components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are At least the following is claimed:

1. A method, comprising:
   determining, by at least one computing device, a status of a client device;
   determining, by the at least one computing device, whether the status of the client device violates a compliance rule associated with operation of the client device;
   in response to determining that the client device violates the compliance rule, accessing a device record established by the at least one computing device for the client device, the device record comprising data specifying an operating system executing on the client device;
   determining whether the client device lacks an application native to the operating system of the client device with an application programming interface (API) that supports direct communication with the at least one computing device for remotely restricting access to a hard disk storage device of the client device;
   adding, by the at least one computing device, a command to restrict access to the hard disk storage device of the client device into a command queue associated with the client device, wherein an agent application executed on the client device retrieves the command from the command queue; and
   in response to determining that the client device lacks the application, initiating, by the at least one computing device, execution of an operating system kernel call on the client device in response to retrieving the command from the command queue, the operating system kernel call comprising a routine for removing a boot signature from a master boot record of the hard disk storage device of the client device without user interaction.

2. The method of claim 1, wherein the agent application initiates execution of the operating system kernel call.

3. The method of claim 2, wherein the operating system kernel call comprises a hard disk reimaging routine.

4. The method of claim 3, wherein the operating system kernel call causes the operating system kernel to initiate re-formatting of the hard disk storage device in the client device.

5. The method of claim 3, wherein the operating system kernel call causes the operating system kernel to initiate reimaging of the hard disk storage device in the client device utilizing a default disk image stored in the client device.

6. The method of claim 3, further comprising: retrieving, by the agent application a base disk image from a server.

7. The method of claim 1, wherein determining that the client device violates the compliance rule comprises determining that the client device failed to periodically communicate with the at least one computing device according to a predetermined time interval while meeting a threshold level of activity on the client device.

8. A system, comprising:
   at least one computing device; and
   a data securement application executed by the at least one computing device, the data securement application causing the at least one computing device to at least:
      determine a status of a client device;
      determine whether the status of the client device violates a compliance rule associated with operation of the client device;
      in response to determining that the client device violates the compliance rule, access a device record established by the at least one computing device for the client device, the device record comprising data specifying an operating system executing on the client device;
      determine whether the client device lacks an application native to the operating system of the client device with an application programming interface (API) that supports direct communication with the at least one computing device for remotely restricting access to a hard disk storage device of the client device;
      add a command to restrict access to the hard disk storage device of the client device into a command queue associated with the client device, wherein an agent application executed on the client device retrieves the command from the command queue; and
      in response to determining that the client device lacks the application, initiate execution of an operating system kernel call on the client device in response to retrieving the command from the command queue, the operating system kernel call comprising a routine for removing a boot signature from a master boot record of the hard disk storage device of the client device without user interaction.

9. The system of claim 8, wherein determining that the client device violates the compliance rule comprises detecting an unauthorized attempt to access a restricted access storage in the client device.

10. The system of claim 8, wherein determining that the client device violates the compliance rule comprises determining that the client device failed to periodically communicate with the at least one computing device according to a predetermined time interval while meeting a threshold level of activity on the client device.

11. The system of claim 8, wherein determining that the client device violates the compliance rule comprises detecting an unauthorized attempt to remove at least one predetermined application loaded on the client device.

12. The system of claim 8, wherein the agent application initiates execution of the operating system kernel call.

13. The system of claim 12, wherein the operating system kernel call comprises unmanaged computer code compiled directly to machine code and directly executed by the operating system.

14. The system of claim 12, wherein the operating system kernel call comprises a hard disk reimaging routine.

15. The system of claim 14, wherein the operating system kernel call is configured to cause the operating system kernel to initiate reimaging of the hard disk storage device in the client device utilizing a default disk image stored in the client device.

16. The system of claim 14, wherein upon reimaging of the hard disk storage device, the client device automatically enrolls with the at least one computing device.

17. The system of claim 14, wherein the data securement application further causes the agent application to retrieve a base disk image from a server.

18. The system of claim 8, wherein the agent application initiates execution of the operating system kernel call.

19. A non-transitory computer-readable medium embodying a program executable in at least one computing device, the program, when executed by the at least one computing device causes the at least one computing device to perform the operations of:

determining a status of a client device;

determining whether the status of the client device violates a compliance rule associated with operation of the client device;

in response to determining that the client device violates the compliance rule, access a device record established by the at least one computing device for the client device, the device record comprising data specifying an operating system executing on the client device;

determining whether the client device lacks an application native to the operating system of the client device with an application programming interface (API) that supports direct communication with the at least one computing device for remotely restricting access to a hard disk storage device of the client device;

adding a command to restrict access to the hard disk storage device of the client device into a command queue associated with the client device, wherein an agent application executed on the client device retrieves the command from the command queue; and in response to determining that the client device lacks the application, initiating execution of an operating system kernel call on the client device in response to retrieving the command from the command queue, the operating system kernel call comprising a routine for removing a boot signature from a master boot record of the hard disk storage device of the client device without user interaction.

20. The non-transitory computer-readable medium of claim 19, wherein initiating execution of the operating system kernel call comprises the application programming interface (API) configured to interface with an operating system (OS) kernel, the OS kernel being configured to control operation of the hard disk storage device.

21. The non-transitory computer-readable medium of claim 20, wherein the operating system kernel call comprises a hard disk reimaging routine.

22. The non-transitory computer-readable medium of claim 21, wherein the reimaged hard disk storage device includes the installed agent application configured to cause the client device to automatically enroll with the at least one computing device and grant the at least one computing device administrator privilege over the client device.

* * * * *